(12) United States Patent
Mendoza Flores et al.

(10) Patent No.: US 11,589,578 B2
(45) Date of Patent: Feb. 28, 2023

(54) PAINTING WITH BIOCIDES COMPOSITION AND/OR PROLONGED RELEASE PESTICIDES

(71) Applicant: SUPERNOVA COATING S.A. DE C.V., Mexico City (MX)

(72) Inventors: Bernando Agustin Mendoza Flores, Mexico City (MX); Jose Maria Ribot Barroso, Mexico City (MX)

(73) Assignee: Supernova Investment Group, LLC, Miami, FL (US)

( * ) Notice: Subject to any disclaimer, the term of this patent is extended or adjusted under 35 U.S.C. 154(b) by 0 days.

(21) Appl. No.: 16/513,116

(22) Filed: Jul. 16, 2019

(65) Prior Publication Data

US 2020/0022366 A1     Jan. 23, 2020

(30) Foreign Application Priority Data

Jul. 20, 2018    (MX) .................... MX/a/2018/008965

(51) Int. Cl.

| | |
|---|---|
| *A01N 25/28* | (2006.01) |
| *C09D 5/14* | (2006.01) |
| *C09D 133/08* | (2006.01) |
| *B01J 13/04* | (2006.01) |
| *C09D 5/33* | (2006.01) |
| *A01N 53/00* | (2006.01) |
| *A01N 25/10* | (2006.01) |
| *C09D 5/22* | (2006.01) |

(52) U.S. Cl.
CPC ............ *A01N 25/28* (2013.01); *A01N 25/10* (2013.01); *A01N 53/00* (2013.01); *B01J 13/046* (2013.01); *C09D 5/004* (2013.01); *C09D 5/14* (2013.01); *C09D 5/22* (2013.01); *C09D 133/08* (2013.01)

(58) Field of Classification Search
CPC . C09D 5/14; C09D 5/22; A01N 53/00; C08K 9/10; C08K 5/0058
See application file for complete search history.

(56) References Cited

U.S. PATENT DOCUMENTS

| | | | |
|---|---|---|---|
| 3,400,093 A | 9/1968 | Feinberg | |
| 5,063,059 A * | 11/1991 | Ohtsubo | ................ A01N 25/28 |
| | | | 514/765 |
| 5,931,994 A | 8/1999 | Herrero | |
| 6,280,759 B1 | 8/2001 | Price et al. | |
| 6,881,248 B2 | 4/2005 | Lee et al. | |
| 9,968,095 B1 * | 5/2018 | Ribot Barroso | ......... C09D 7/70 |

* cited by examiner

*Primary Examiner* — Andrew S Rosenthal
(74) *Attorney, Agent, or Firm* — Porzio Bromberg & Newman P.C.

(57) ABSTRACT

This invention refers to a paint composition with prolonged release biocides to repel, reduce, and control insects, characterized by:
a) A cbp vehicle, preferably a water-based acrylic vinyl paint;
b) At least one pyrethroid biocide or its mixture, selected from:
    b1) microencapsulated deltamethrin as an active ingredient:
    b2) microencapsulated cypermethrin as an active ingredient;
Where said pyrethroid biocides are activated or catalyzed through (PBO) piperonyl butoxide, and
Wherein said microcapsules of the active ingredients are obtained through a microencapsulation process by interfacial polymerization, and/or a microencapsulation by ionic gelation process, for a prolonged release with regards to the biocidal active ingredients' interval.

9 Claims, No Drawings

PAINTING WITH BIOCIDES COMPOSITION AND/OR PROLONGED RELEASE PESTICIDES

CROSS-REFERENCE TO RELATED APPLICATIONS

The present application claims priority from Mexico patent Application No. MX/a/2018/008965 filed on Jul. 20, 2018, the entire contents of which are incorporated herein by reference.

FIELD OF INVENTION

The present invention is related to chemistry in general, in detail it elated to the water-based coatings formulation field such as paints, enamels, inks, sealants, polyurethanes, among others. More specifically it refers to an improved paint composition with biocides and/or extended release pesticides formulation to repel, reduce, and control insects.

BACKGROUND OF THE INVENTION

Insects are arthropods that are characterized by having a pair of antennae, three pairs of legs and two pairs of wings (which can be deduced or missing). Insects are the most diverse group on the planet and there is a great diversity of species with around one million species described and can be found in almost all environments on the planet.

Insects are one of the types of animals that are most interrelated with human activities. From the useful insects that provide us honey or silk to the ones that are poisonous or transmitters of deadly diseases. There are countless species that are directly or indirectly associated with the human being (Newman, L. H. 1971).

The noticeable and tangible benefits that originate in the different activities of insects from the use of things that they do, collect, or produce (honey, wax, silk, etc.,) and to a lesser extent lacquers, paints, and dyes. Insects and their products have use in medicine or in the diet of human beings.

Insects play a great role in the functions of the environment. They are the main predators of other invertebrates and therefore pest controllers. They decompose and eliminate a significant percentage of organic matter and are the main pollinators of plants of ecological and economic importance. However, and sometimes derived from their high abundance, they have been considered as a harmful group, since they consume close to a third of the crops worldwide and are the main vectors of human diseases (Brusca and Brusca, 2002).

The insects coexist with the human being since always and are part of the planet's ecological balance, since they are food for birds, reptiles, and for other insects. On the other hand, many transmit serious diseases, such as dengue, Chagas disease, Zika, chikungunya, yellow fever, malaria, among other diseases; therefore, its control is very important.

There are several methods of insect control such as biological control, chemical control (insecticides, pesticides, acaricides, nematicides, systemic and non-systemic insecticides, organic controls, among others).

There are also other methods of insect control that can naturally control a pest, environmentally; heat and rainfall can help restrict species distribution. On the other hand, geography and distribution of natural properties such as large bodies of water, mountain ranges, and deserts define the location and proliferation of certain types.

There are also other types of insects beneficial to humans that control the proliferation of other insects.

There are insecticide products in the market such as aerosols, plates, creams, and tapes made of plastic, paper, and anti-insect paints, with different degrees of effectiveness. However, these products have little residual and very high cost, as well as strong and toxic odors for human beings and some of them use pesticides as active ingredients which are hazardous to health.

There is a wide range of products that are not allowed in countries with a high natural culture due to their current legislation (such as Sweden, Denmark, etc.) since the degree of irritation and/or other possible effects that they sometimes generate affect the environment where the human beings live and develop.

In the case of our formulation it is necessary to consider the way in which the active ingredient interacts with the paint, so that once the first one is dispersed in the second one, the final product is conserved and at the same time releases the active agent in a gradual and programmed way.

Microencapsulation is a modern and innovative technique that reaches various areas of human knowledge and its applications awaken growing interest in various fields of technology and achieving the integration of diverse products, from agriculture to the food industry, cosmetics, and pharmacy, as well as, in the textile and aerospace industry.

The different types and forms of microcapsules release the material they contain, following a programmed mechanism according to the medium where they are dispersed. The microcapsules are used to give a different and/or additional functionality when formulating a product, for example, in the perfume industry, an essential oil is microencapsulated to obtain a different presentation to the liquid one, being in a semi-solid or solid optimizing the use of resources for the desired effect or functionality so that the amount of active ingredients can be reduced without reducing the desired effect (less concentration).

Microencapsulation consists of applying a thin cover on small solid particles, liquid droplets, or dispersions, in order to protect some materials, separate them, or facilitate their storage and handling. It may also have the purpose of causing the release of the coated substance conditions or in a delayed, gradual, or prolonged form.

These conditions necessary for the cession can be humidity, physical force, or the combination of them; particles that are covered in the microcapsule have a size that varies between one and 500 microns. The size can be controlled in the manufacturing process.

The microencapsulation is used in order to alter some physical properties of liquids or solids to protect them or make them more manageable. With this technique you can convert oily substances into solid products. It is possible to control the cession as modification of some colloidal and superficial properties of the coated substances.

It also allows to mix and store together substances that react or that are incompatible with each other. It is also used to mask the bad taste or smell of the substances and reduces the volatile characteristics of some of them.

The following documents were located carrying out a search to determine the state of the closest technique:

The U.S. Pat. No. 6,280,759 B1 patent from Ronald R. Price et al was located on Mar. 7, 1989 disclosing microtubes containing an active agent in its cavity and compositions that contain such microtubes are effective to provide a slow and controlled release of the active agent. Such microtubes are useful in the production of coating compositions for the protection of surfaces that come into contact with water, adhesive resins to produce laminated wood products and devices for dispensing pesticides. Wherein said active agent is one or more members selected from the group consisting of fungicides, herbicides, insecticides, pheromones, hormones, antibiotics, anthelmintic, and anti-fouling agents.

U.S. Pat. No. 6,881,248 B2 of Han Lim Lee el al from Dec. 10, 2002, which discloses a paint composition that can counteract the development of insecticide resistance in insects comprised of deltamethrin in the range of 25 mg to 50 mg per liter of paint used as the first component, piperonyl butoxide in the range of 12.5 to 1350 mg per liter of paint used, and the emulsion paint as the third component.

U.S. Pat. No. 5,931,994A of Maria Pilar Mateo Herrero from Dec. 23, 1996, which discloses a paint composition for controlling pests and allergens through a chitin synthesis inhibitor, comprised of a mixture of 10 to 40% in water weight, from 5 to 50% in resin weight, from 0.001 to 40% in chitin inhibitor weight, from 0.001 to 5% in weight of an organophosphate, from 1 to 40% in pigment weight, 1 to 60% in carrier material weight, and 1 to 20% in stabilizer weight, where the percentages in weight are based on the total weight of the composition and in which the chitin inhibitor is microencapsulated in a polymer of resin.

Also found is U.S. Pat. No. 3,400,093A of Feinberg Irving dated Mar. 11, 1966 which discloses a process for manufacturing an insecticidal polymer comprising of dissolving at least one organic insecticide in at least one vinyl polymerizable monomer, said monomer and other type of vinyl monomers with which polymerization is carried out and that the predominant monomeric units in the polymer are provided; scattering said monomer in the form of droplets through an aqueous liquid polymerization medium where said monomer is substantially immiscible and wherein said insecticide is substantially insoluble, and polymerizing said monomer by emulsion polymerization techniques and obtaining a stable polymer latex containing small discrete normally solid particles of polymer having said insecticide incorporated therein.

However, the products mentioned in the cited documents have competitive disadvantages compared to our development, since our formulation has a dual effect in applications such as vinyl paints, this dual effect increases the performance and effectiveness of the product. Thanks to this high performance, the effectiveness of repelling, decreasing and controlling flying and crawling insects is even greater.

The development of this new formulation is due to observations on the production process of the previous formula, also for practical reasons, this improvement offers better yields and different (smaller) particle size.

The prolonged release of the active agents, as well as the stability offered by the obtained microcapsules and their fixation on the substrate allows them to be added to a medium in which they can be dispersed. On the other hand, the microcapsules are activated when atmospheric or medium conditions are appropriate.

Particles or microcapsules of greater homogeneity are achieved under this new invention, as well as of smaller size. The above allows a better dispersion of the same on any vehicle of choice such as paint, aerosols, and other means of application.

On the other hand, one of the great added values that this improvement contributes besides prolonged release (functionality) of different active ingredients in different time intervals is that the microencapsulated particles become practically unnoticeable to the consumer when dispersed in paints (appearance and design).

The paint market is in great demand and colors and forms of application vary according to the type of paint being used, in many cases no paint is used but a finish of another type of material such as textured, fine, plastered, rustic, palladium, splashed, brickwork, etc. flattening on plaster, and smooth surfaces require that microcapsules are barely perceptible or even imperceptible.

On the other hand, some components of the previous formula were able to be eliminated, allowing us to make a more stable, efficient and of homogeneous physical-chemical composition product. One of the greatest benefits obtained through this change is focused on improving the production and speed of the processes since certain elements that are not practical causes the spherical size of the capsule and therefore agglomerates generating therefore that the filler roller clogs.

Thanks to this exhaustive scientific work it is possible to optimize the formula by eliminating certain materials that although contribute to a good performance of the microcapsule and its repellent and/or insecticidal effect, on the other hand, affect and limit the efficiency in production, especially in the process of dispersing microcapsules in paint and other similar vehicles, for example:

Silica.—It is a substance that absorbs moisture from the medium in which it is dispersed, and the initial formula contains a large amount of it. When mixed with the microcapsule formed large granules and in the subsequent filling step the valves were clogged.

Boric acid.—This powder reacted with the paint neutralizing the medium where the substrate was and though it was not enough, it was fixed on the wall together with the resin that brings the painting into its constitution.

Calcium oxide.—Alkaline powder that was added to the coating composition, for example, a paint together with Boric Acid though adding it at different intervals to avoid a previous decomposition reaction.

The pigments are not modified, only one agent must be found for gel formation and that is distributed homogeneously in the substrate, each pigment will have a specific function.

OBJECTIVES OF THE INVENTION

The main objective of the present invention is to provide a paint composition with biocides and/or prolonged release pesticides with double microencapsulation and optionally use high luminosity pigments that offer good stability to the microcapsules, which can be added to a medium in which can be dispersed more easily, once applied on a substrate allows to repel, reduce and control application insects for different substrates.

Another object of the invention is to provide said paint composition with biocides and/or prolonged-release pesticides, which in addition said particles or microcapsules are of smaller size and offer greater effect which helps to a greater dispersion thereof within any vehicle of choice.

Another objective of the invention is to provide said paint composition with biocides and/or prolonged release pesticides, which also, offers a dual effect in applications such as vinyl paints, where this dual effect increases the performance and effectiveness of the product.

Another objective of the invention is to provide said paint composition with biocides and/or prolonged-release pesticides, which also offers low toxicity and does not affect human beings, domestic animals and/or farm animals.

Another objective of the invention which could or could not be used in the formulation since it will be used as an optional element is to provide said paint composition with biocides and/or prolonged-release pesticides, also offering a high luminosity that when mixed with insecticidal components act simultaneously to attract insects and control them instantly.

Another objective of the invention is to provide said paint composition with biocides and/or prolonged-release pesticides, which also offers a longer lasting residual effect to repel, reduce, and control flying and crawling insects, with greater efficiency and for a much longer prolonged time than what is currently on the market.

Another objective of the invention is to provide said paint composition with biocides and/or prolonged-release pesticides, which can also be impregnated, but not limited to substrates such as textiles, paper, plastics, wood, metals, stones, concretes, plastering, plasters and any element of construction and interior design in general.

Another objective of the invention is to provide said paint composition with, biocides and/or prolonged-release pesticides, which also allows controlling insect populations using commonly used routes such as paints in homes, hospitals, schools, ports, airports, farms, wineries, industrial warehouses, construction companies, hotels, public, and private sectors, etc.

Another objective of the invention is to provide said paint composition with biocides and/or prolonged-release pesticides, which also allows the population of flies that transmit all kinds of diseases to humans to decrease; avoid and/or reduce the possibility of contagion of these diseases, allowing benefits in the health system.

And all those objectives and advantages that will become evident with the reading of the present description in combination with the attached compositions that form an integral part of the present one.

DESCRIPTION OF THE INVENTION

In general, the paint composition with biocides and/or prolonged-release pesticides to repel, reduce, and control insects consists of a cbp vehicle, preferably a water-based vinyl paint mixed with at least one insecticidal active ingredient with highly effective double microencapsulation; and optionally includes a microencapsulated reflective pigment and/or a microencapsulated high luminosity photoluminant pigment, which generates a dual effect to repel and control insects.

The following are the main physical-chemical properties of the insecticides to be considered when selecting the microcapsule a.—Alkalinity Resistance Alkalinity is something natural and common in almost all the materials used in the construction of houses and, with this, in the supports in which the anti-insect paint is going to be applied. This factor is of decisive importance in the application of pesticides since the great majority of active ingredients, particularly organophosphates and carbamates, decompose in alkaline media, needing pH between 5 and 6 to remain relatively stable (Table A).

TABLE A

Average life of some insecticidal active ingredients in aqueous media.

| Active ingredient | Decomposition time (Average life) |
|---|---|
| Diflubenzuron | Stable in the pH range between 5 and 7. Hydrolyzes at pH 9. |
| cypermethrin | pH 9 (7 days). Stable at a pH 4. Very stable in acid solutions |
| deltamethrin | pH 7 (8 hrs.) more stable in medium acid solutions than alkaline ones |
| D-allethrin | Stable at a pH 5 after 31 days. pH 7 (500 days) pH 9 (4.3 days) |
| Chlorpyrifos | A pH 10 (7 days). It is stable in neutral and slightly acid solutions. |
| Diazinon | pH 9 (136 days). pH 7.5 (185 days). pH 5 (31 days). |
| Malathion | It hydrolyses rapidly at pH above 7. The optimum pH range is between 5 and 6. |
| Permethrin | Stable at a pH between 5 and 6. |
| Methylperimiphos | A pH 8 (5 days). pH 5 (7 days). |
| Pyriproxyfen | Stable in the pH range betiveen 4 and 9. |

The active ingredient microcapsule release mechanisms can be by microcapsule porosity release, thermal expansion, fracture by force, or pressure and friction.

The microcapsules of the present invention maintain the active substances in a 7-9 pH range and the paint maintains an 8-9 pH which achieves an ideal medium for its application and preservation, allowing to have a stability for an adequate time, a half-life that does not harm the painting effectiveness interval b. Adherence.

Normally, outdoor paints have adhesion on substrates such as concrete, cement, and the rest of the mineral components that are usually found in a façade or work wall; but sometimes there are other types of materials where this type of paint adherence is not satisfactory. A paint is of high adhesion and the microcapsules of the present invention do not interfere at all in this feature.

c. Outdoors Resistance.

This properly is intended to measure the ability of formulations to maintain their properties against all types of external abiotic agents, moisture, solar radiation, heat, pressure, and even biotic agents such as microorganisms, fungi, and other living beings.

In the case of the paintings, all suffer a deterioration—to a greater or lesser degree—when exposed to the inclement weather. The most common effects are yellowing, cracking, and can also heat up (they give off surface dust). To measure their resistance to inclement weather exposed to an "accelerated aging", subjecting the sample to a UV radiation more intense than normal, as well as, to varying conditions of humidity and heat.

d. Heat Resistance

This property is especially important in insecticides and/or pesticides that have active ingredients of the pyrethroid family, since they degrade very rapidly at high heats. By the formulation of our additive with microcapsules, this has a greater resistance to heat than conventional insecticides individually e. Wet Rub Resistance This property, complementary to water resistance, indicates the degree of washability that a coating has. It is also a way to measure the paint resistance in case of very intense rains.

Studies and investigations of the existing insecticides were carried out in order to determine which are suitable for interaction with human beings, domestic animals, farm animals, but, above all, which had the function of repelling and eliminating flying and crawling insects. Thanks to this, the optimal components for this development were determined and selected.

On the other hand, options were analyzed to increase the useful life of the product, as well as its effectiveness from the double microencapsulation process; vital process in the product increasing its useful his and action for more than 24 months.

Next, some insecticides are described in a more non-limiting manner which can be used in the formulation.

| Insecticides | | | | |
|---|---|---|---|---|
| Nomenclature | Type of product | Active ingredient | Toxicity | Presentation |
| Coumaphos | Insecticide | Coumaphos | Toxic | Powder |
| Triclorphon | Insecticide | Metrifonate | Moderately toxic | Powder |
| Boric acid | Insecticide | Hydrogen borate | Group II Moderately toxic | powder |
| dimethyl carbomate | Insecticide | Carbomate | Group II Moderately toxic | Liquid |
| Carbofuran | Insecticide | Carbomate | Group II moderately toxic | Liquid |
| Alfa Cipermethrin | Insecticide | Cypermethrin | Group II Moderately toxic | powder |

The paint composition with prolonged release biocides to repel, reduce, and control insects, in preferred embodiment consists of:
a) A cbp vehicle, preferably a water-based acrylic vinyl paint;
b) At least one pyrethroid biocide or its mixture, selected from:
   b1) microencapsulated deltamethrin as an active ingredient;
   b2) microencapsulated cypermethrin as an active ingredient;
Where said pyrethroid biocides are activated or catalyzed by (PBO) piperonyl butoxide.

Alternatively, and optionally as an addition to the paint composition with biocides and/or extended release pesticides to repel, reduce, and control insects, includes at least one of, or the mixture of:
   c) a microencapsulated photoluminescent pigment,
   d) a microencapsulated reflecting pigment.

In the case of the composition that includes at least one of, or the mixture of, a microencapsulated photoluminescent pigment and a microencapsulated reflecting pigment, it generates a dual effect providing a strong attraction of insects when the product is applied on any surface, due to the luminosity as a result of the mixture of the described components, works with a high effectiveness and efficiency both during the day and at night thanks to the high luminosity pigments that mainly have the property of glowing in the dark when charging light energy and/or thermal by any source, whether natural or artificial; that is, with the effect of attracting lucifugus insects with positive phototaxis working 24 hours in comparison to 8 hours of traditional products.

Some of the insects attracted by the light component of the present invention composition are moths, flies, mosquitoes, and many other lucifugus insects that have positive phototaxis, meaning they are naturally attracted to it.

Other insects such as cockroaches, insect larvae have negative phototaxis, which means that they will not be attracted by the composition's luminosity but will be repelled or killed by it given the insecticidal composition.

In the preferred invention modality, the biocides microcapsules of the paint composition with prolonged release biocides to repel, reduce, and control insects is made through a microencapsulation process by interfacial polymerization, and a microencapsulation process by ionic gelation for a prolonged release with regards to the biocidal active ingredients' interval.

The microencapsulation comprises a quite heterogeneous set of procedures and employs very diverse techniques and materials within which three stages can be considered to obtain it, the most important to follow for their manufacture are:
   Nucleus
   Coating material
   Characterization The nucleus is comprised of substances of a liquid nature (mineral oil) in which the active ingredients are incorporated, which can be liquids of (preferably) or emulsified or dispersed solids in a suitable vehicle or related to the polymer liquid.

In the nucleation process, the core material is constituted by solid particles or small drops of liquid and their integration carried out through agitation using adjuvants, stabilizers, antioxidants, and diluents.

The coating materials used must be common between the core and shell since its hydrophilic or hydrophobic nature can cause repulsion of charges and therefore a destabilization of the particle, as a result, the reaction would return and there would be no polymer.

In the characterization, the core material is given under certain conditions that promote their release, these conditions are independent of moisture and pH, as well as, the pressure and mechanical force acting on them.
Variable Identification The following is considered in the microcapsule release process:
1.—Minimum percentage concentration
2.—Concentration of active ingredient to be released
3.—pH of the medium
4.—Type of paint to use
5.—Heat to apply
6.—Environmental heat
7.—Surface roughness to paint
8.—Insects to eliminate
9.—Endemic insects
10.—Invading insects
11.—Pests
12.—Film thickness
Micro Encapsulation Processes Used
a) microencapsulation process by interfacial polymerization, and
b) microencapsulation process by ionic gelation Microcapsules are obtained with the use of these two microencapsulation processes, which offer the advantage of encapsulating the active ingredient and achieving its release in a gradual manner and in stages, allowing handling of several mixtures to achieve this.
   a) Microencapsulation by interfacial polymerization—In this process, a polymer of a monomer is produced at the interface of two immiscible substances, which gives rise to the formation of a membrane that will later be a precursor of the microcapsule wall. In this form of reaction, the following phenomena are followed: 1. Dispersing the aqueous solution of a water-soluble material in an organic phase to produce a stable w/o emulsion. 2. Formation of a polymeric membrane on the surface of water droplets that is initiated by the addition of a soluble or dispersible complex in the oil of the previous emulsion. 3. Separation of the microcapsules of the organic phase and its transfer to another container to remove the water, the separation of the final microcapsules is done through centrifugation.

b) For the gelation process there is an ion exchange of the electric double layer that is formed between the nuclei of the bonding atoms, soluble calcium salt is added to the field of a previously stirred emulsion. The particle size cannot be controlled if the agitator does not have the correct speed.

In external gelation, the soluble calcium salt is added in an A/O emulsion. The particle size cannot be well controlled, and particles tend to coagulate in large masses before acquiring the proper consistency. Also, the particle size that is obtained is big.

In this variety of process, the microcapsule has a relatively simple morphological structure. It is composed of two clearly differentiated elements, the active core and a thin polymeric framework (shell) that surrounds the first one, by the properties of the polymer, a gradual release of these active ingredients is achieved, inserted according to the specific requirements of application of the substrate in which the microcapsules are deposited.

The core is composed of substances of a liquid nature (mineral oil) in which insecticidal active ingredients are incorporated.

The formation of the microcapsule is a complex chemical-physical process with which a suspension of microcapsules ranging between one and several hundred micrometers is obtained. The progressive and controlled release of the microencapsulated active ingredients is achieved thanks to the fact that the nature of the coating polymer allows it.

The fundamental element of the formulation of the additive is the insecticidal and/or biocidal polymeric microcapsule. Optionally and alternatively it can also contain other components such as a photoluminescent pigment of high luminosity whose main charge is calcium carbonate. The polymer is a vinyl and insecticides vary depending on the type of vector, place of application, strategy to follow for the control of the pest and the different regulations.

In any case, they are always insecticidal and acaricidal active ingredients with a broad spectrum of action and frequently used in many insecticide formulations. Thus, pyrethroids are used when you want to perform an immediate control and achieve a great shock effect without requiring a high residuality. Organophosphates are used in the case that it is intended to obtain a prolonged effectiveness against a more immediate effect. In all cases, the paint incorporates a crawler/cockroach repellent insecticide.

Microcapsule Chemical Development A polymer is a chemical substance composed of macromolecules, usually organic, that have been formed by the union of smaller repeating molecules called monomers.

Thus, achieving a formulation with a gradual release and at the same time effective will depend, to a large extent, on the proportions in which these monomers are included to form the resulting polymer, though also on other factors inherent to the manufacturing process such as the moment of incorporation of the insecticide active ingredients and the temperatures reached.

For the different stages of life, for example, of a paint (manufacture—liquid paint) (liquid/dry paint application) (retention—dry paint) of different types of polymer. First, the manufacturing stage in which the polymer is dispersed in water which makes the hardness of the shell be low, when applied and drying begins, its hardness increases, in the case of the hard polymer, the microcapsule would be so rigid that it would not allow an easy release of the active ingredient. On the contrary, in the case of the soft polymer, the release would be so fast that the persistence of the efficiency would be too low. In the case of the polymer of the present invention, the appropriate hardness and flexibility balance is obtained, achieving a high persistence of the effectiveness by controlled release of active ingredients.

Other equally important steps are the addition of fillers and pigments and the active ingredients insecticides and/for pesticides (biocides), and stabilizers, required to form the insecticidal polymer microcapsule that protects the assets in an acidic medium (pH 4-5) to maintain the chemical stability of the same over time and, with it, all their insecticidal properties.

A double shell can be granted to an active ingredient giving it a longer life in its release so that this feature could be controlled over time.

EXAMPLE 1

Cypermethrin microcapsules formulated by microencapsulation through interfacial polymerization of Cypermethrin (active ingredient, biocide).

In the interfacial polymerization, melamine with chitosan and an active agent with the encaser which glutaraldehyde is used and sealed with calcium chloride.

Components from 20% to 40% mineral oil;
10% to 15% active ingredient (biocide) Cypermethrin;
from 2% to 5% propylene glycol
2% to 5% Piperonyl Perbutoxide (PBO)
from 1% to 4% of a 15% NF-10 solution
from 1% to 4% Melamine
from 1% to 4% of Chitosan
from 1% to 2% of 50% acetic acid
from 2% to 4% of 25% glutaraldehyde
from 0.1% to 0.5% of 50% sodium hydroxide
from 0.1% to 0.5%% of 5% calcium chloride
distilled water as a cbp vehicle

EXAMPLE 2

Deltamethrin microcapsules formulated by microencapsulation through interfacial polymerization of Deltamethrin (active ingredient, biocide).

In the interfacial polymerization, melamine with chitosan and an active agent with the encaser which glutaraldehyde is used and sealed with calcium chloride.

Components from 20% to 30% mineral oil;
from 9% to 15% of active ingredient (biocide) Deltamethrin;
from 15% to 20% propylene glycol
2% to 5% Piperonyl Perbutoxide (PBO)
from 1% to 4% of a 15% NF-10 solution
from 1% to 4% Melamine
from 1% to 4% of Chitosan
from 1% to 2% of 50% acetic acid
from 2% to 4% of 25% glutaraldehyde
from 0.1% to 0.5% of 50% sodium hydroxide
from 0.1% to 0.5%% of 5% calcium chloride
distilled water as a cbp vehicle Methodology 1.—Weigh melamine and the active ingredient (biocide with mineral oil) (Cypermethrin or Deltamethrin) together with the propylene glycol;

2.—Melamine, the active ingredient (Cypermethrin or Deltamethrin) with mineral oil and propylene glycol are homogeneously incorporated in a reactor for 30 minutes and chitosan previously dispersed in a solution with 50% acetic acid is added;

3.—Stir vigorously until a paste is formed and add a 50% sodium hydroxide solution, piperonyl perbutoxide, 15% NF-10 solution, and a bit of 25% glutaraldehyde;

4.—Stir for 30 minutes and add the remaining 25% glutaraldehyde followed by 5% calcium chloride;

5.—Stir the resulting mixture for 40 minutes and arrange for filtration or, if necessary, decant. The filter paper is washed 3 times with distilled water and the formed product is saved;

6.—Centrifuge and air dry under pressure.

7.—For convenience, use the material dispersed in aqueous solution (slurry) in the form of wet powder 8.—Pack and store in sealed containers and avoiding light)

Microencapsulation Process by Ionic Gelation

In the ionic gelation, gelatin, Guar gum, Xanthan gum, or Arabic gum, and chitosan are used in addition to the active ingredients using an encapsulating agent which is glutaraldehyde and sealed with calcium chloride.

EXAMPLE 3

Cypermethrin-Deltamethrin microcapsules formulated by Microencapsulation through ionic gelation.

Components
- from 15% to 20% mineral oil;
- from 10% to 11% of active ingredient (biocide) Cypermethrin-Deltamethrin (in a 20-20 ratio); from 4% to 9% propylene glycol
- 2% to 5% Piperonyl Perbutoxide (PBO)
- from 1% to 4% of a 15% NF-10 solution
- from 1% to 3% of Gelatin, Guar gum, Xanthan gum, or Arabic gum
- from 1% to 3% of Chitosan
- from 1% to 2% of 50% acetic acid
- from 2% to 4% of 25% glutaraldehyde
- from 0.1% to 0.5% of 50% sodium hydroxide
- from 0.1% to 0.5%% of 5% calcium chloride
- distilled water as a cbp vehicle In the preferred modality of the invention, the following is used for the formulation of one liter of paint:
a) Water based vinyl-acrylic paint as vehicle
b) from 60% to 80%, preferably 71.75% of Cypenethrin microcapsules formulated by Microencapsulation by interfacial polymerization;
c) from 5% to 8%, preferably 6.73% of Deltamethrin microcapsules formulated by Microencapsulation by interfacial polymerization,
b) from 18% to 71.75% of Cypermethrin-Deltamethrin microcapsules formulated by Microencapsulation by interfacial polymerization;

In the paint formulation, the microcapsules of the stabilized and emulsified active agents are mixed together with the paint and direct homogenization for immediate use.

The mixture is made at an agitation speed of 8,000-25,000 rpm obtaining an average viscosity of 950,000 cps and left in constant agitation for 1-5 hrs. to obtain an average viscosity of at least 250,000 cps and stirring another interval of 1.5 hr. to obtain a viscosity of 200,000 cps.

In another of the modalities of the paint formulated as described, slurry is incorporated for an immediate effect in the painting.

The following components are used in the Slurry formulation:
a) Cypermethrin 14.21%
b) Deltamethrin 4.74%
c) Mineral Oil 46.55%
d) Propylene glycol 22.98%
e) NF-10 at 20%, 11.52%

For its production it is required a specialized high purity stainless steel equipment, it must also be a high speed mixer in stainless steel, and fastened with sealed doors with adjusted grubs to avoid mixture volatility, with speed regulator since at very high speeds, you can break the microcapsule and/or generate a lot of heat inside and this can cause the microcapsule to break and the desired effects decrease or disappear.

This innovation is aimed at controlling and reducing diseases transmitted by insects inability to vulnerable classes, since this additive has low costs and is compatible with 90% of the formulas of paints, regardless of price or brand.

The formulation according to the present invention contains several very important, competitive, and differentiating advantages from the technical and process point of view (double microencapsulation, original formula, and combination with independent biocide elements) as well as, from the practical point of view since said formulation presents a better performance for insect control due to its useful life that exceeds 24 months, as well as, its activated effect. On the other hand, our product can release different active ingredients in different time periods, which does not allow insects to generate immunity to said biocides and/or pesticides over time. Optionally and/or alternatively, luminescent and reflective pigments can be added to the product formulation in such a way that the paint manages to attract lucid insects with positive phototaxis and repel those with negative phototaxis. Finally, from the economic point of view our product has a lower cost compared to existing products and above all, can be used on any surface that, but not limited to, we mention below: substrates such as textiles, paper, plastics, wood, metals, stones, concretes, plasters, and any construction element and interior design. The social benefits are wide since our invention will be a very important player in the control of pests and diseases transmitted by insects.

An important part of the double encapsulation is that through this system we incorporate the use of different microencapsulated insecticide elements that will be released in different intervals (two or more depending on the number of families of insecticides added to the formula). The release programming is controlled from the specific characteristics of the microcapsule used during the manufacturing process (shell size and hardness). The benefits of this system allow elimination resistance that insects develop over time to certain insecticides, since release programming of different families of insecticides over time, reduces the natural evolution of insects to generate resistance and therefore, allows effective pest control.

The combination of microencapsulation methods and use of other materials, as well as the microencapsulation process, make it possible to obtain a product that, due to its nature, has a longer duration compared to environmental factors such as heat, pressure, pH, among others. On the other hand, the product, thanks to the different microencapsulation techniques used, as well as alternative slurry inclusion (optional), allows a release of active ingredients (pyrethroids) in different time intervals. Initially, slurry actively releases the pyrethroids (biocides), subsequently the microcapsules manufactured from the ionic gelation and by interfacial polymerization; the above due to the nature of the shell of each of the products.

On the other hand, this invention through the use of different microencapsulation disciplines allows a greater product effectiveness from the prolonged release of active ingredients at different time intervals because as is well known, insects generate defenses and/or immunity to certain active ingredients to which they are exposed to and it is from this invention that said insects receive different combinations of active ingredients (pyrethroids) over time, reducing their immunity and significantly increasing the effectiveness of the product.

The combination of two microencapsulation techniques allows the release of active agents in three different stages consisting of:

1.—Initial release in a period from 6 months to a year, also observing that it works from 1 to 9 months with an optimum effectiveness achieved by the release of formula components
2. —Average release for a period of 1 to 2 years due to changes in environmental heat, atmospheric pressure, or increased environment humidity, and works in good conditions in a period of 1 to 2.5 years.
3.—Slow or final release for a period of 1 to 3 years due to environmental humidity effects, microcapsules fracture due to mechanical effects, and observation of slow release in a final period of 1 to 4 years of effectiveness, already low but still acceptable.

Improves product effectiveness from prolonged release of active ingredients at different time intervals since, as is well known, insects generate defenses and/or immunity to certain active ingredients to which they are exposed and is as of this invention that said insects receive different combinations of active ingredients (pyrethroids) over time, reducing their immunity, and significantly increasing product effectiveness.

The invention has been sufficiently described so that a person with average skills in this matter can reproduce and obtain the results that we mentioned in the present invention.

However, any skilled person who is competent in the present invention may be able to make modifications not described in the present application, however, if for the application of these modifications in a certain structure or in the manufacturing process of the same, it is required of said matter in the following claims, said structures should be included within the scope of the invention.

The invention claimed is:

1. A paint composition with prolonged release biocides to repel, reduce, and control insects, comprising:
   a) a dispersing medium of a water-based acrylic vinyl paint;
   b) microcapsules comprising at least one pyrethroid biocide or its mixture, selected from:
      b1) microencapsulated deltamethrin as an active ingredient;
      b2) microencapsulated cypermethrin as an active ingredient; and
      b3) microencapsulated cypermethrin and deltamethrin as active ingredients;
   c) at least one pyrethroid biocide or its mixture, selected from:
      c1) cypermethrin slurry; and
      c2) deltamethrin slurry;
   where said at least one pyrethroid biocide is activated or catalyzed by piperonyl butoxide (PBO) and dispersed within the vinyl acrylic paint, forming a synergistic effect between the piperonyl butoxide (PBO) and the active ingredients of the microcapsules, as well as between the piperonyl butoxide (PBO) and the slurry and wherein said microcapsules of the active ingredients are obtained by a microencapsulation process through interfacial polymerization, and/or a microencapsulation process through ionic gelation, for an extended release in terms of time of biocidal active ingredients.

2. The paint composition with prolonged release biocides to repel, reduce, and control insects, according to claim 1, wherein said microcapsules of microencapsulated cypermethrin are comprised of:
   from 20% to 40% mineral oil;
   10% to 15% active ingredient of the cypermethrin;
   from 2% to 5% propylene glycol;
   from 1% to 4% melamine;
   from 1% to 4% of chitosan;
   from 1% to 2% of 50% acetic acid;
   from 2% to 4% of 25% glutaraldehyde;
   from 0.1% to 0.5% of 50% sodium hydroxide;
   from 0.1% to 0.5% of 5% calcium chloride;
   and
   distilled water to complete a final volume of an emulsion to be encapsulated.

3. The paint composition with prolonged release biocides to repel, reduce, and control insects, according to claim 1 wherein said microcapsules of microencapsulated deltamethrin are comprised of:
   from 20% to 30% mineral oil;
   from 9% to 15% of active ingredient of the deltamethrin;
   from 15% to 20% propylene glycol;
   from 1% to 4% of 10 mole nonyl phenol
   from 1% to 4% melamine;
   from 1% to 4% of chitosan;
   from 1% to 2% of 50% acetic acid;
   from 2% to 4% of 25% glutaraldehyde;
   from 0.1% to 0.5% of 50% sodium hydroxide;
   from 0.1% to 0.5% of 5% calcium chloride; and
   distilled water to complete a final volume of an emulsion to be encapsulated.

4. The paint composition with prolonged release biocides to repel, reduce, and control insects, according to claim 1, wherein said microcapsules of microencapsulated of cypermethrin and deltamethrin are comprised of:
   from 15% to 20% mineral oil;
   from 10% to 11% of active ingredients of cypermethrin and deltamethrin (in a 20-20 ratio;
   from 4% to 9% propylene glycol;
   from 1% to 3% gelatin, xanthan gum, guar gum, or Arabic gum;
   from 1% to 3% of chitosan;
   from 1% to 2% of 50% acetic acid;
   from 2% to 4% of 25% glutaraldehyde;
   from 0.1% to 0.5% of 50% sodium hydroxide;
   from 0.1%10 0.5%% of 5% calcium chloride;
   distilled water to complete a final volume of an emulsion to be encapsulated.

5. The paint composition with prolonged release biocides to repel, reduce, and control insects, according to claim 2 wherein said microcapsules of encapsulated cypermethrin and microcapsules of deltamethrin are obtained through a microencapsulation process through interfacial polymerization.

6. The paint composition with prolonged release biocides to repel, reduce, and control insects, according to claim 4, wherein said microcapsules of encapsulated cypermethrin and deltamethrin are obtained through a microencapsulation process by ionic gelation.

7. The paint composition with prolonged release biocides to repel, reduce, and control insects, according to claim 1 comprising
  a) from 60% to 80% of microcapsules of the microencapsulated cypermethrin formulated by microencapsulation by interfacial polymerization;
  b) from 5% to 8%, of microcapsules of microencapsulated deltamethrin formulated by microencapsulation by interfacial polymerization,
  b) from 18% to 71.75% of microcapsules of microencapsulated cypermethrin and deltamethrin formulated by microencapsulation by ionic gelation.

8. The paint composition with prolonged release biocides to repel, reduce, and control insects, according to claim 7, having a slurry dispersion in 10 mole nonyl phenol.

9. The paint composition with prolonged release biocides to repel, reduce, and control insects, according to claim 7, wherein the slurry comprising:
  a) microcapsules of the microencapsulated cypermethrin;
  b) microcapsules of the microencapsulated deltamethrin;
  c) Mineral Oil;
  d) Propylene glycol; and
  e) 10 mole nonyl phenol.

\* \* \* \* \*